F. M. BRINCKERHOFF.
UNIT SECTION SHEATHING FOR CARS.
APPLICATION FILED OCT. 27, 1913.
1,090,595.
Patented Mar. 17, 1914.
2 SHEETS—SHEET 1.
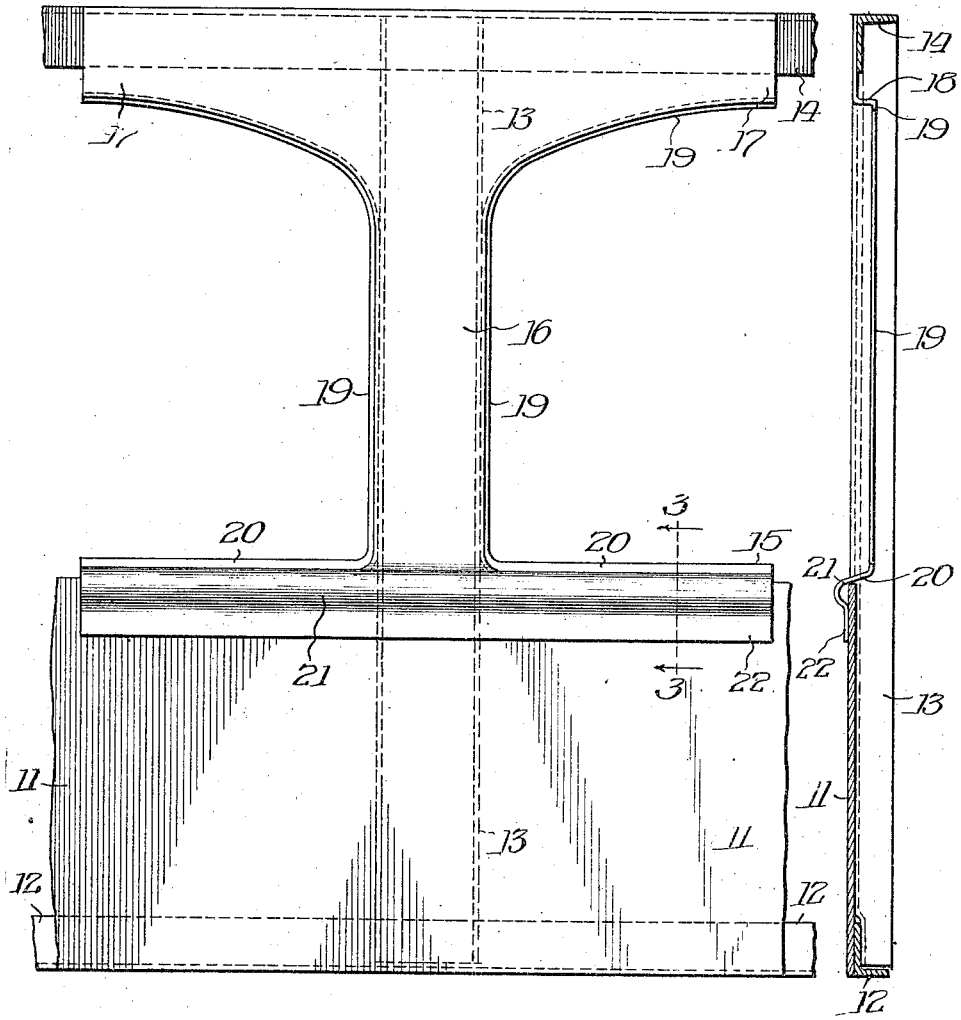
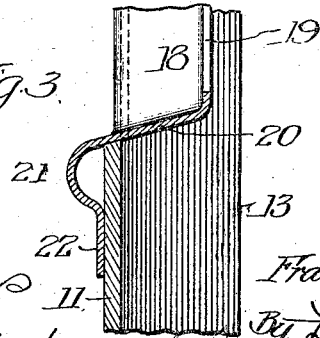

F. M. BRINCKERHOFF.
UNIT SECTION SHEATHING FOR CAR.
APPLICATION FILED OCT. 27, 1913.
1,090,595.
Patented Mar. 17, 1914.
2 SHEETS—SHEET 2.
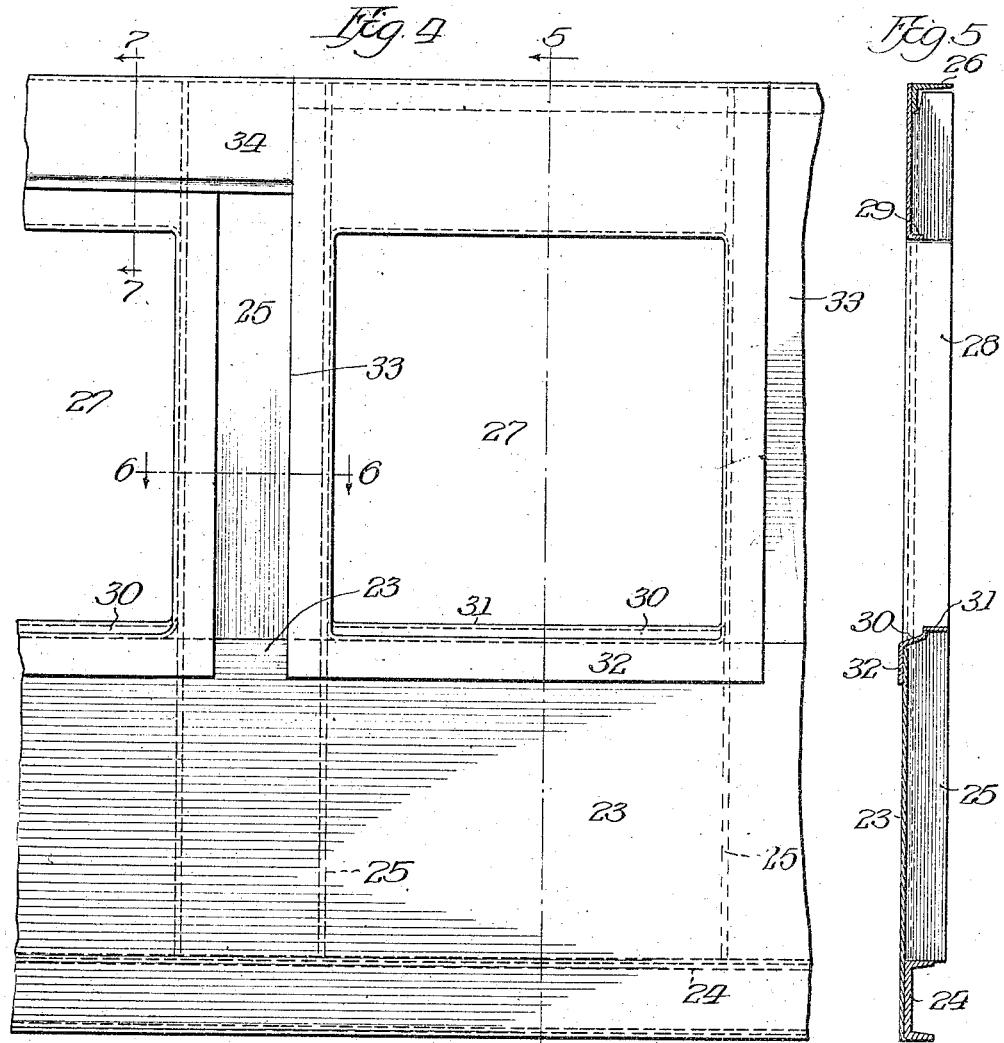
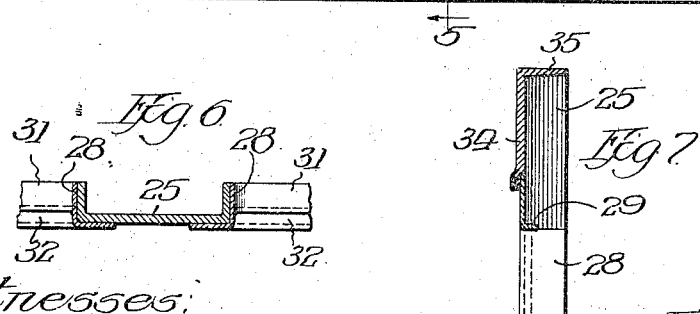

UNITED STATES PATENT OFFICE.

FRANCIS M. BRINCKERHOFF, OF ENGLEWOOD, NEW JERSEY, ASSIGNOR TO FORSYTH BROTHERS COMPANY, OF CHICAGO, ILLINOIS, A CORPORATION OF ILLINOIS.

UNIT-SECTION SHEATHING FOR CARS.

1,090,595.

Specification of Letters Patent. Patented Mar. 17, 1914.

Application filed October 27, 1913. Serial No. 797,418.

*To all whom it may concern:*

Be it known that I, FRANCIS M. BRINCKERHOFF, a citizen of the United States, residing at Englewood, in the county of Bergen and State of New Jersey, have invented certain new and useful Improvements in Unit-Section Sheathing for Cars, of which the following is a specification.

The invention has for its primary object a simplification and lightening of the sheathing and consequently a reduction in the cost of manufacture accompanied by an increased rigidity of the car structure due to a proper and economical distribution of the weight of metal as between points where more strength is or is not needed under the requirements of service.

A further object of the invention is the doing away with overlapping riveted or welded joints along the lower side sheathing of the car and an improved finish of the letter board section and of the window panel sheathing and window trim.

Having these general objects in view the invention contemplates the construction of the side sheathing of a car below the windows of a metal sheet, either continuous or in sections, sufficiently heavy to take the shear load from the side plate and by way of the posts and transmit it to the sill, as also to withstand the rough usage devolving in service upon this exposed portion of the car, while the upper sheathing embracing the window panels and the letter board may be formed of lighter metal and impart an ornamental finish about the windows and may include an overlapping belt rail or drip rail connection with the lower side sheathing.

Carrying out the idea of the invention, the upper sheathing may be continuous but it is preferably composed of unit sections with the line of junction between adjacent units either along the medial vertical line of the window openings, or along the medial vertical line of the panels between the windows or the adjacent edges, or contiguous units may be separated by a space extending vertically between the windows and bridged by the car posts. In either case the principle of the invention applies and moreover the inventive idea is further carried out by preferably flanging the upper sheathing inwardly above and at the sides of the window openings to form the window frame and sash support while below the opening the sheathing is outwardly bent and then inwardly flanged to form the belt or drip rail and window sill overlying the lower side sheathing which extends longitudinally of the car beneath the windows.

In order that the structural features of the invention may be readily understood the preferred and modified embodiments of the same are set forth in the accompanying drawings and in the description based thereon. As, however, it will be obvious to those skilled in the art that the invention may be embodied in other forms of construction without departing from the legitimate scope thereof it is to be understood that the drawings and description are to be taken in an illustrative and not in an unnecessarily limiting sense.

In the drawings: Figure 1 is a side elevation of a portion of a car side showing an I-shaped unit section embodying the invention; Fig. 2 is an edge view of the unit section showing the side sheathing belt in vertical section; Fig. 3 is a fragmentary sectional view through the belt or drip rail on an enlarged scale; Fig. 4 is a composite view in side elevation of a portion of a car side showing two other embodiments of the invention; Fig. 5 is a vertical section on the line 5—5 of Fig. 4; Fig. 6 is a horizontal section on the line 6—6 of Fig. 4; and Fig. 7 is a vertical section on the line 7—7 of Fig. 4.

In these drawings and having particular reference to Figs. 1, 2 and 3, the lower side sheathing of the car is shown as a belt or sheet 11 of comparatively heavy sheet metal extending longitudinally of the car beneath the window openings and attached below to the side sill 12 and also to the outer face of the side post 13 which extends from the side sill 12 to a point of attachment to the side plate 14. This side sheathing sheet or bel  .ay extend continuously from one end of the car to the other or it may be formed in sections joined together by butt welding or in other suitable man. r. This sheathing belt by reason of its width and comparatively heavy gage is well adapted to take the shear load by means of the side post from the side plate and transmit the same to the side sill thus rendering unnecessary the provision of heavy sheathing along the upper portion of the car and largely confining the function of the upper sheathing to that of an exterior finish.

The upper sheathing is shown as made up of I-shaped unit sections which for convenience may be designated as comprising each a lower belt rail portion 15 below the window opening, a panel portion 16 extending between the window openings, and a letter board portion 17 above the window openings. In this form of construction each of the units embraces vertically the letter board and belt rail and the intervening portion of the car side, while longitudinally it includes adjacent halves of two contiguous window openings.

The rectangular sheet of metal from which the sheathing unit is to be made is by a press provided upon opposite sides of a medial line and in those portions corresponding to the adjacent halves of the window openings with a depression in the shape of a panel of which the lower portion is offset in a plane parallel to the general plane of the sheet. The offset portion is then punched out at a slight distance from its edge so as to leave an opening having a margin. It will thus be seen that the unit section is provided on opposite sides of its medial portion with openings forming adjacent halves of two contiguous windows which are defined by the inturned continuous flange 18, and offset continuous flange 19, extending upon the two sides and above the window openings to form the frame or casing, and across the bottom of the opening to form a sash rest or sill 20. Along its lower portion beneath the flanged openings the sheet of metal is outwardly bent to form the belt or drip rail 21 and its lower edge offset at 22 to overlap the lower side sheathing 11, as clearly shown in Figs. 2 and 3.

It will be seen that when the car side is built up of these sections the lower side sheathing 11 extends the length of the car below the openings and the series of units forming the upper sheathing and the belt rail being joined each to the adjacent unit along the medial vertical line of the window openings, each entire window opening is defined by the inturned continuous flange 18 and the offset continuous marginal flange 19, while a continuous belt rail is formed by the curved portion 21 of adjacent units. The offset lower edge of the upper sheathing units rests against and is suitably secured to the lower sheathing 11, while the window panel portion of the units rests against and may be suitably secured to the side posts 13, the letter board portion 17 being suitably attached to the side plate.

Having reference particularly to Figs. 4 to 7 inclusive the lower side sheathing 23, as in the construction previously described extends longitudinally of the car, being rigidly secured to the side sill 24 and to the post 25 which in turn is attached to and supports the side plate 26. The upper sheathing units in this form of construction comprise essentially rectangular sheets having their inner portion punched out and inwardly flanged to form the window openings 27 with a marginal frame or casing formed by the side flanges 28, top flange 29 and the lower stepped flange forming the window sill 30, and sash rests 31, the lower edge of each sheet is slightly offset at 32 and overlaps the lower sheathing 23, as shown in Fig. 5. In this form of construction the outwardly curved bead of the belt rail is shown as omitted. If desired, the units may be provided, as in the former case, with an offset continuous flange surrounding the opening.

It will be observed that there is no direct connection between adjacent edges of contiguous sheathing units, they being separated by a vertical space 33 wherein the front face of the post 25 is exposed, or the post may be covered by a window panel sheathing extending from the side sheathing 23 upwardly to the letter board.

In the embodiment shown at the right hand side in Fig. 4 the sheathing unit extends upwardly to the top of the car side and forms a letter board as an integral part of the sheathing unit whereas at the left hand side of said figure a modification is shown in which the sheathing unit terminate at a short distance above the window opening and abuts against a shoulder formed by the offset lower edge of the letter board 34 which is formed as an integral part of a top plate 35.

I claim:

1. In a sheathing for cars, the combination of an upper sheathing terminating substantially at the line of the belt rail and providing window openings, that portion of the sheathing between the window openings being integral with the portion at the bottom of the openings, and a lower sheathing extending longitudinally of the car beneath the line of the belt rail, the lower margin of the upper sheathing overlapping the upper margin of the lower sheathing, substantially as described.

2. In a sheathing for cars, the combination of an upper sheathing terminating substantially at the line of the belt rail and providing window openings, that portion of the sheathing between the window openings being integral with the portion at the bottom of the openings, and a lower sheathing extending longitudinally of the car beneath the line of the belt rail, the lower margin of the upper sheathing overlapping the upper margin of the lower sheathing, the window openings bounded below and at the sides by integral portions of the upper sheathing extending inwardly therefrom at an angle thereto, substantially as described.

3. In a sheathing for cars, the combination of a series of sheathing units providing window openings and terminating immediately below the window sill, a sheet of sheathing extending longitudinally of the car below the windows, the sheathing units outwardly bent along their lower edges and overlapping the lower side sheathing to form a belt rail, substantially as described.

4. In a sheathing for cars, the combination of a series of sheathing units providing window openings and terminating immediately below the window sill, and a sheet of sheathing extending longitudinally of the car below the windows, the sheathing units flanged inwardly at the sides of the windows to form a window frame and outwardly bent and inwardly flanged below the openings to form a belt rail and window sill, substantially as described.

5. In a sheathing for cars, the combination of a series of sheathing units providing window openings and terminating immediately below the window sill, and a sheet of side sheathing extending longitudinally of the car below the windows, the sheathing units flanged inwardly at the top and sides of the windows to form a window frame and outwardly bent and inwardly flanged below the openings to form a belt rail and window sill, the belt rail overlapping the underlying side sheathing, substantially as described.

6. In a sheathing for cars, the combination of a series of sheathing units providing window openings and including letter board and window panel sections, said units terminating in a belt rail, and a sheet of heavier sheathing covering the side of the car below the belt rail, substantially as described.

7. In a sheathing for cars, the combination of a series of sheathing units providing window openings and including letter board and window panel sections, said units terminating in a belt rail, and a sheet of heavier sheathing covering the side of the car below the belt rail, the line of junction between adjacent units being along the vertical medial line of the window openings, substantially as described.

8. In a sheathing for cars, the combination of a series of sheathing units providing window openings and including letter board and window panel sections, said units terminating in a belt rail, and a sheet of heavier sheathing covering the side of the car below the belt rail, the sheathing units flanged inwardly at the sides of the windows to form the window frame, and inwardly flanged below the openings to form the window sill, and side posts disposed between and bearing against the adjacent flanges of contiguous windows and connected to the lower sheathing and side plate, substantially as described.

In testimony whereof I have hereunto signed my name in the presence of two witnesses.

FRANCIS M. BRINCKERHOFF.

Witnesses:
W. E. RUNDLE,
M. M. DORLAND.